United States Patent
Dimartino et al.

(10) Patent No.: US 11,286,986 B2
(45) Date of Patent: Mar. 29, 2022

(54) SPLIT BEARING, ASSEMBLY, AND METHOD OF MAKING AND USING THE SAME

(71) Applicant: SAINT-GOBAIN PERFORMANCE PLASTICS CORPORATION, Solon, OH (US)

(72) Inventors: Vincent Dimartino, Clifton, NJ (US); Alan F. Hunter, Nutley, NJ (US); Devika Ranganathan, Mountain Lakes, NJ (US); Brandon S. Murphy, West Milford, NJ (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 0 days.

(21) Appl. No.: 17/091,508

(22) Filed: Nov. 6, 2020

(65) Prior Publication Data
US 2021/0140473 A1  May 13, 2021

Related U.S. Application Data

(60) Provisional application No. 62/932,698, filed on Nov. 8, 2019.

(51) Int. Cl.
*F16C 33/04* (2006.01)
*F16C 17/04* (2006.01)
(Continued)

(52) U.S. Cl.
CPC ............ *F16C 33/046* (2013.01); *F16C 17/04* (2013.01); *F16C 33/1095* (2013.01);
(Continued)

(58) Field of Classification Search
CPC ........ F16C 11/04; F16C 11/045; F16C 17/04; F16C 17/10; F16C 33/046; F16C 33/1095;
(Continued)

(56) References Cited

U.S. PATENT DOCUMENTS 1,271,077 A * 7/1918 Probasco .................... F16J 9/14
277/499
1,715,268 A * 5/1929 Ayers, Jr. ............... B21D 53/10
148/589
(Continued)

FOREIGN PATENT DOCUMENTS

CN    107429733 A  * 12/2017  .............. F16C 17/10
CN    109477519 A  *  3/2019  .............. F16C 43/02
(Continued)

OTHER PUBLICATIONS

International Search Report and Written Opinion for PCT/US2020/059400, dated Feb. 24, 2021, 10 pages.

*Primary Examiner* — Marcus Charles
(74) *Attorney, Agent, or Firm* — Abel Schillinger, LLP; Chi Suk Kim

(57) ABSTRACT

A bearing including a bearing sidewall including a first circumferential end including an apex region, and a second circumferential end including a nadir region, where the first circumferential end and the second circumferential end are adapted to contact each other to form an interface, where at least one of the apex region or the nadir region includes a void to prevent contact between the apex region of the first circumferential end and the nadir region of the second circumferential end, where the bearing sidewall includes a substrate and a low friction material, and where at least one of the first circumferential end or the second circumferential end comprises an end face that is free of low friction material.

19 Claims, 6 Drawing Sheets

(51) Int. Cl.
- *F16C 33/10* (2006.01)
- *F16C 33/12* (2006.01)
- *F16C 33/14* (2006.01)
- *F16C 33/20* (2006.01)

(52) U.S. Cl.
CPC ............ *F16C 33/121* (2013.01); *F16C 33/14* (2013.01); *F16C 33/208* (2013.01); *F16C 2204/60* (2013.01); *F16C 2208/58* (2013.01); *F16C 2220/44* (2013.01); *F16C 2240/30* (2013.01); *F16C 2350/54* (2013.01)

(58) Field of Classification Search
CPC .... F16C 33/121; F16C 33/14; F16C 2204/60; F16C 2208/58; F16C 2220/44; F16C 2350/54; F16C 2326/26; F16C 2240/30; F16F 33/208
USPC ....... 384/273, 276, 296–297, 912, 907, 908; 29/898.042, 898.054, 898.055
See application file for complete search history.

(56) References Cited

U.S. PATENT DOCUMENTS

| | | | | |
|---|---|---|---|---|
| 2,177,584 | A * | 10/1939 | Salansky | F16C 33/14 |
| | | | | 29/898.056 |
| 2,528,987 | A * | 11/1950 | Charles | F16C 33/605 |
| | | | | 384/570 |
| 2,762,117 | A | 9/1956 | Houck | |
| 2,865,692 | A * | 12/1958 | Gossmann | F16C 33/20 |
| | | | | 384/298 |
| 3,507,022 | A | 4/1970 | Conru | |
| 3,710,674 | A * | 1/1973 | Tabor | F16B 19/1081 |
| | | | | 411/61 |
| 4,072,368 | A * | 2/1978 | Ehrentraut | F16C 33/12 |
| | | | | 384/295 |
| 4,541,157 | A | 9/1985 | Tsushima et al. | |
| 4,907,626 | A | 3/1990 | Mori | |
| 4,909,638 | A * | 3/1990 | Muto | F16C 43/02 |
| | | | | 384/273 |
| 5,251,986 | A * | 10/1993 | Arena | F16C 11/045 |
| | | | | 384/208 |
| 5,727,885 | A | 3/1998 | Ono et al. | |
| 5,803,614 | A * | 9/1998 | Tsuji | F16C 33/121 |
| | | | | 384/276 |
| 6,485,186 | B2 * | 11/2002 | Wood | F16C 33/60 |
| | | | | 29/418 |
| 6,588,248 | B1 | 7/2003 | Bickle et al. | |
| 7,270,484 | B2 * | 9/2007 | Waseda | F16C 9/04 |
| | | | | 384/570 |
| 7,458,726 | B2 * | 12/2008 | Seilheimer | F16C 43/02 |
| | | | | 29/898.058 |
| 7,866,891 | B2 * | 1/2011 | Waseda | F16C 33/60 |
| | | | | 384/457 |
| 8,500,335 | B2 | 8/2013 | Inagaki et al. | |
| 8,819,939 | B2 * | 9/2014 | Pohlman | F16C 33/60 |
| | | | | 29/898.066 |
| 8,840,308 | B2 * | 9/2014 | Ortiz | F16C 33/124 |
| | | | | 384/297 |
| 8,894,292 | B2 | 11/2014 | Yamakawa et al. | |
| 9,168,726 | B2 * | 10/2015 | Ponnouradjou | F16C 33/28 |
| 9,869,349 | B2 * | 1/2018 | Rittmann | F16C 33/046 |
| 10,094,155 | B2 * | 10/2018 | Neumark | F16C 33/205 |
| 10,132,346 | B2 | 11/2018 | Oishi et al. | |
| 2001/0031596 | A1 * | 10/2001 | McDonald | F16C 33/201 |
| | | | | 442/389 |
| 2009/0235887 | A1 | 9/2009 | Oishi et al. | |
| 2011/0049834 | A1 | 3/2011 | Natu | |
| 2011/0064350 | A1 | 3/2011 | Yamakawa et al. | |
| 2012/0240350 | A1 * | 9/2012 | Natu | B62K 21/06 |
| | | | | 16/2.2 |
| 2014/0044385 | A1 * | 2/2014 | Andelkovski | F16C 33/208 |
| | | | | 384/276 |
| 2015/0260222 | A1 | 9/2015 | Kumagai et al. | |
| 2016/0069112 | A1 | 3/2016 | Neumark et al. | |
| 2016/0290390 | A1 * | 10/2016 | Ambroise | F16C 17/10 |

FOREIGN PATENT DOCUMENTS

| DE | 4311634 A1 * | 10/1993 | ............ F16C 33/201 |
|---|---|---|---|
| JP | 2002195261 A | 7/2002 | |
| JP | 2013002517 A | 1/2013 | |
| KR | 20110126117 A | 11/2011 | |
| WO | WO-2011036126 A1 * | 3/2011 | ............ F16D 1/0835 |

* cited by examiner

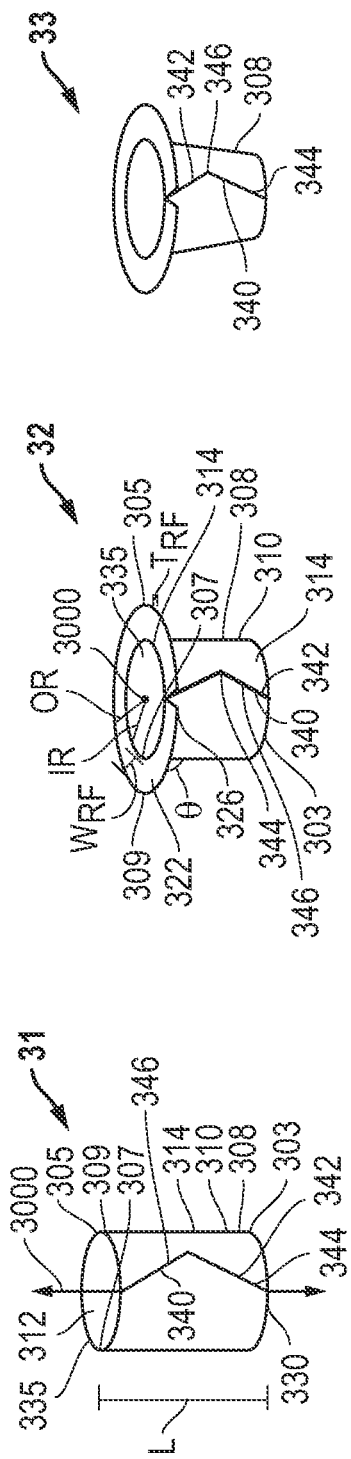
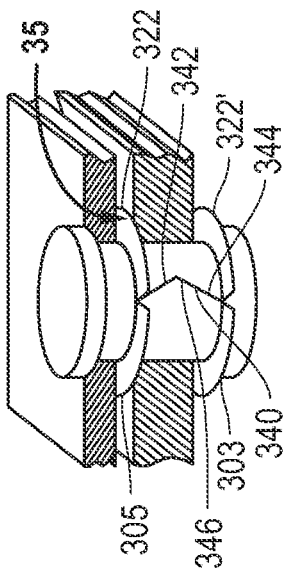
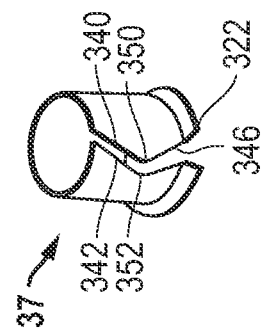
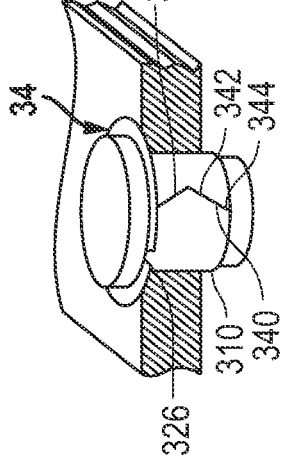
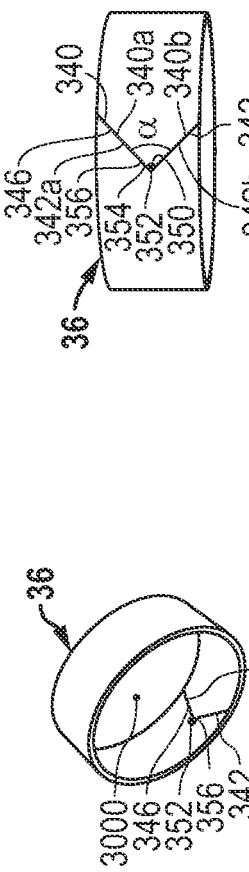

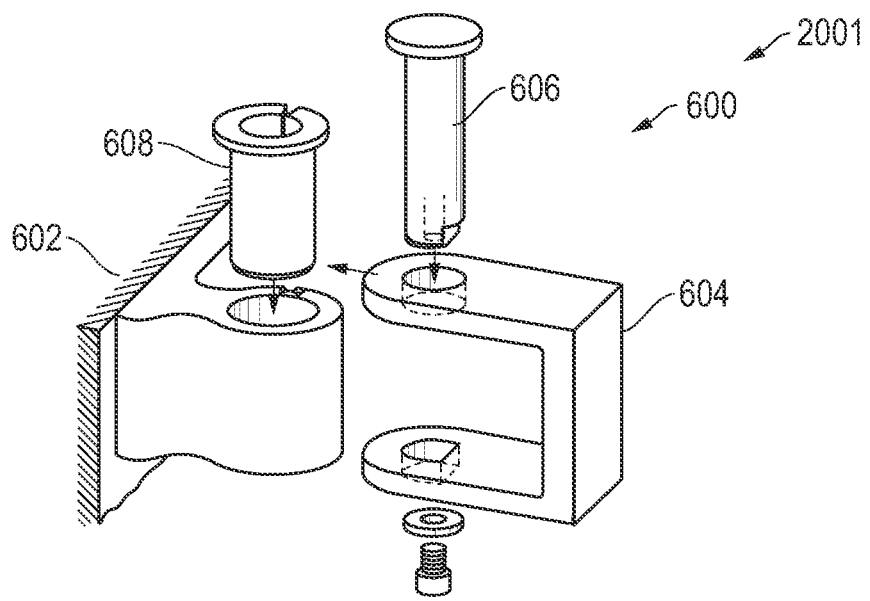
FIG. 6
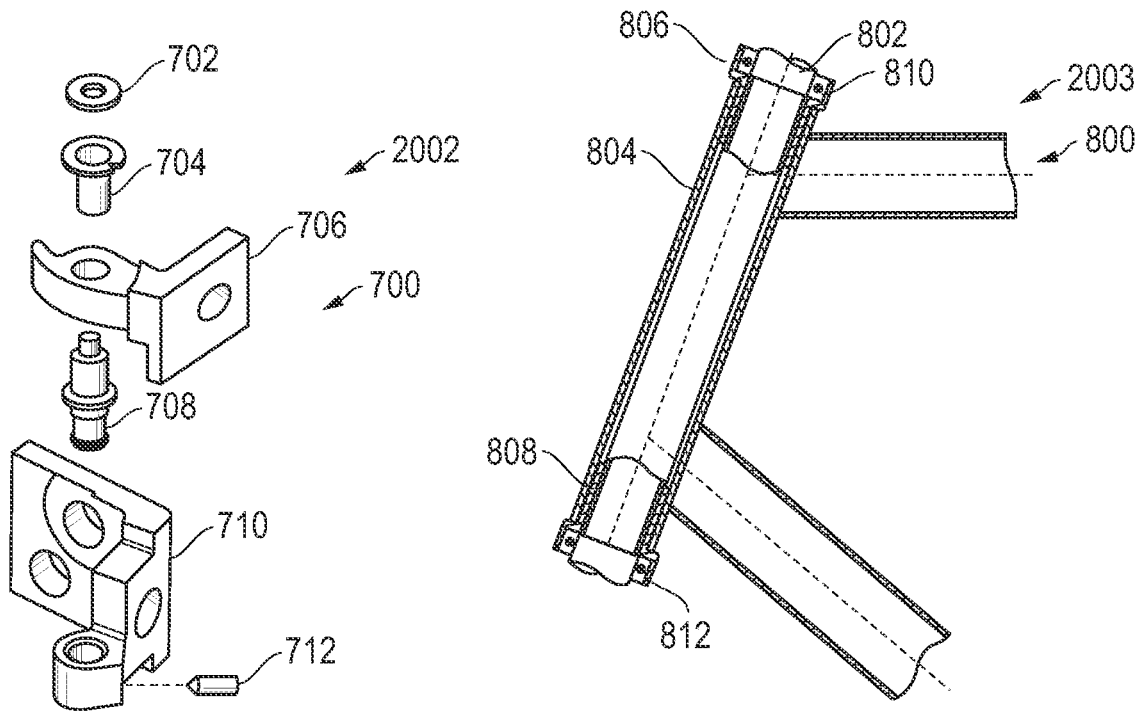
FIG. 7
FIG. 8

SPLIT BEARING, ASSEMBLY, AND METHOD OF MAKING AND USING THE SAME

CROSS-REFERENCE TO RELATED APPLICATION(S)

This application claims priority under 35 U.S.C. § 119(e) to U.S. Provisional Application No. 62/932,698, entitled "SPLIT BEARING, ASSEMBLY, AND METHOD OF MAKING AND USING THE SAME," by Vincent DIMARTINO et al., filed Nov. 8, 2019, which is assigned to the current assignee hereof and incorporated herein by reference in its entirety.

FIELD OF THE DISCLOSURE

This disclosure, in general, relates to bearings, in particular bearings with split in their circumferential sidewall and method of production and assembly thereof.

BACKGROUND

Bearings are generally known to provide reduced friction between mated components, which are movable with respect to one another in an assembly. Bearings may be used in assemblies with applications in the vehicle industry, for example, for door, hood, and engine compartment hinges, seats, steering columns, flywheels, balancer shaft bearings, etc., or may be used for non-automotive applications. Conventionally, bearings often include a low friction material to provide a slip interface between these mated components. Some bearings may have straight-line axial splits in the circumferential direction for ease of assembly or use purposes. Despite advances in the art, there is an ongoing need for improved split bearings that have a longer lifetime, improved effectiveness, and overall improved performance within an assembly.

BRIEF DESCRIPTION OF THE DRAWINGS

The present disclosure may be better understood, and its numerous features and advantages made apparent to those skilled in the art by referencing the accompanying drawings.

FIG. 3A is an illustration of a bearing according to a number of embodiments;

FIG. 3B is an illustration of a bearing according to a number of embodiments;

FIG. 3C is an illustration of a bearing according to a number of embodiments;

FIG. 3D is an illustration of a bearing according to a number of embodiments;

FIG. 3E is an illustration of a bearing according to a number of embodiments;

FIG. 3F is an illustration of a bearing according to a number of embodiments;

FIG. 3G is an illustration of a bearing according to a number of embodiments;

FIG. 3H is an illustration of a bearing according to a number of embodiments;

FIG. 6 is an illustration of a bearing within an assembly according to a number of embodiments;

FIG. 7 is an illustration of a bearing within an assembly according to a number of embodiments; and FIG. 8 is an illustration of a bearing within an assembly according to a number of embodiments;

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single embodiment is described herein, more than one embodiment may be used in place of a single embodiment. Similarly, where more than one embodiment is described herein, a single embodiment may be substituted for that more than one embodiment.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the bearing and bearing assembly arts.

Figure 1:
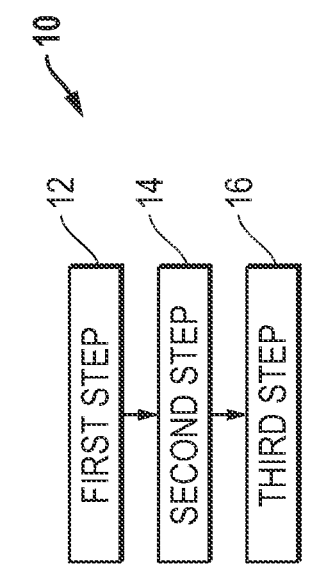
FIG. 1 is an illustration of a stepwise manufacturing process.

For purposes of illustration, FIG. 1 includes a diagram showing a manufacturing process 10 for forming a bearing. The manufacturing process 10 may include a first step 12 of providing a base material, a second step 14 of coating the base material with a low friction coating to form a composite material and a third step 16 of forming the composite material into a bearing.

Referring to the first step 12, the base material may be a substrate. In an embodiment, the substrate can at least partially include a metal support. According to certain embodiments, the metal support may include iron, copper, titanium, bronze, tin, nickel, aluminum, alloys thereof, or may be another type of metal. More particularly, the substrate can at least partially include a steel, such as, a stainless steel, carbon steel, or spring steel. For example, the substrate can at least partially include a 301 stainless steel. The 301 stainless steel may be annealed, ¼ hard, ½ hard, ¾ hard, or full hard. The substrate may include a woven mesh or an expanded metal grid. Alternatively, the woven mesh can be a woven polymer mesh using any of the polymers listed below. In an alternate embodiment, the substrate may not include a mesh or grid.

Figure 2A:
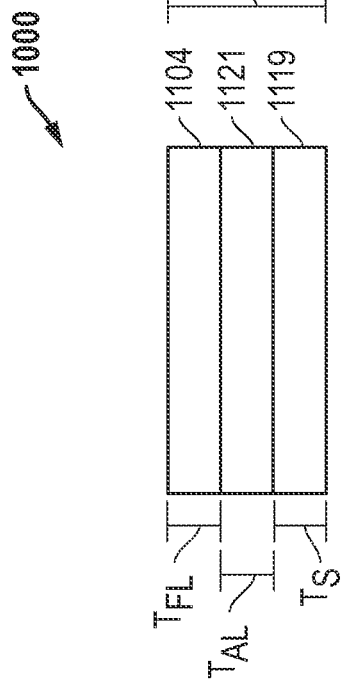
FIG. 2A is an illustration of the layer structure of a bearing according to a number of embodiments.

FIG. 2A includes an illustration of the composite material 1000 that may be formed according to first step 12 and second step 14 of the manufacturing process 10. For purposes of illustration, FIG. 2A shows the layer-by-layer configuration of a composite material 1000 after second step 14. In a number of embodiments, the composite material 1000 may include a substrate 1119 (i.e., the base material noted above and provided in the first step 12) and a low friction layer 1104 (i.e., the low friction coating applied in second step 14). In a number of embodiments, the substrate 1119 may extend at least partially along a length of the composite material 1000. As shown in FIG. 2A, the low friction layer 1104 can be coupled to at least a region of the substrate 1119. In a particular embodiment, the low friction layer 1104 can be coupled to a surface of the substrate 1119 so as to form a low friction interface with another surface of another component. The low friction layer 1104 can be coupled or laminated to the radially inner surface of the substrate 1119 so as to form a low friction interface with another surface of another component. The low friction layer 1104 can be coupled or laminated to the radially outer surface of the substrate 1119 so as to form a low friction interface with another surface of another component.

The substrate 1119 can have a thickness, Ts, of between about 10 microns to about 2000 microns, such as between about 50 microns and about 1500 microns, such as between about 100 microns and about 1000 microns, such as between about 250 microns and about 900 microns. In a number of embodiments, the substrate 1119 may have a thickness, Ts, of between about 300 and 500 microns. In a number of embodiments, the substrate 1119 may have a thickness, Ts, of between about 800 and 950 microns. It will be further appreciated that the thickness, Ts, of the substrate 1119 may be any value between any of the minimum and maximum values noted above. The thickness of the substrate 1119 may be uniform, i.e., a thickness at a first location of the substrate 1119 can be equal to a thickness at a second location therealong. The thickness of the substrate 1119 may be non-uniform, i.e., a thickness at a first location of the substrate 1119 can be different from a thickness at a second location therealong.

In a number of embodiments, the low friction layer 1104 can include a low friction material. Low friction materials may include, for example, a polymer, such as a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), or any combination thereof. In an example, the low friction layer 1104 includes polyketone, such as polyether ether ketone (PEEK), polyether ketone, polyether ketone ketone, polyether ketone ether ketone, a derivative thereof, or a combination thereof. In an additional example, the low friction layer 1104 may include an ultra high molecular weight polyethylene. In another example, the low friction layer 1104 may include a fluoropolymer including fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), or ethylene chlorotrifluoroethylene copolymer (ECTFE). The low friction layer 1104 may include a solid based material including lithium soap, graphite, boron nitride, molybdenum disulfide, tungsten disulfide, polytetrafluoroethylene, carbon nitride, tungsten carbide, or diamond like carbon, a metal (such as aluminum, zinc, copper, magnesium, tin, platinum, titanium, tungsten, iron, bronze, steel, spring steel, stainless steel), a metal alloy (including the metals listed), an anodized metal (including the metals listed) or any combination thereof. Fluoropolymers may be used according to particular embodiments.

In a number of embodiments, the low friction layer 1104 may further include fillers, including glass, carbon, silicon, PEEK, aromatic polyester, bronze, fluoropolymers, thermoplastic fillers, aluminum oxide, polyamidimide (PAI), PPS, polyphenylene sulfone (PPSO$_2$), LCP, aromatic polyesters, molybdenum disulfide, tungsten disulfide, graphite, graphene, expanded graphite, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof. Fillers can be in the form of beads, fibers, powder, mesh, or any combination thereof. The fillers may be at least 10 wt % based on the total weight of the low friction layer, such as at least 15 wt %, 20 wt %, 25 wt % or even 30 wt %.

In an embodiment, the low friction layer 1104 can have a thickness, $T_{FL}$, of between about 1 micron to about 500 microns, such as between about 10 microns and about 400 microns, such as between about 30 microns and about 300 microns, such as between about 50 microns and about 250 microns. In a number of embodiments, the low friction layer 1104 may have a thickness, $T_{FL}$, of between about 100 and 350 microns. It will be further appreciated that the thickness, $T_{FL}$, of the low friction layer 1104 may be any value between any of the minimum and maximum values noted above. The thickness of the low friction 1104 may be uniform, i.e., a thickness at a first location of the low friction layer 1104 can be equal to a thickness at a second location therealong. The thickness of the low friction 1104 may be non-uniform, i.e., a thickness at a first location of the low friction layer 1104 can be different from a thickness at a second location therealong. The low friction layer 1104 may overlie one major surface of the substrate 1119, shown, or overlie both major surfaces. The substrate 1119 may be at least partially encapsulated by the low friction layer 1104. That is, the low friction layer 1104 may cover at least a region of the substrate 1119. Axial surfaces of the substrate 1119 may or may not be exposed from the low friction layer 1104.

In an embodiment, the composite material 1000 may also include at least one adhesive layer 1121 that may couple the low friction layer 1104 to the substrate 1119 (i.e., the base material provided in the first step 12) and a low friction layer 1104 (i.e., the low friction coating applied in second step 14). In another alternate embodiment, the substrate 1119, as a solid component, woven mesh or expanded metal grid, may be embedded in at least one of the adhesive layer 1121 or the low friction layer 1104.

The adhesive layer 1121 may include any known adhesive material common to the bearing arts including, but not limited to, epoxy resins, polyimide resins, polyether/polyamide copolymers, ethylene vinyl acetates, ethylene tetrafluoroethylene (ETFE), ETFE copolymer, perfluoroalkoxy (PFA), or any combination thereof. Additionally, the adhesive can include at least one functional group selected from —C═O, —C—O—R, —COH, —COOH, —COOR, —CF$_2$═CF—OR, or any combination thereof, where R is a cyclic or linear organic group containing between 1 and 20 carbon atoms. Additionally, the adhesive can include a copolymer. In an embodiment, the hot melt adhesive can have a melting temperature of not greater than 250° C., such as not greater than 220° C. In another embodiment, the adhesive may break down above 200° C., such as above 220° C. In further embodiments, the melting temperature of the hot melt adhesive can be higher than 250° C. or even higher than 300° C.

In an embodiment, the adhesive layer 1121 can have a thickness, $T_{AL}$, of between about 1 micron to about 100 microns, such as between about 5 microns and about 80 microns, such as between about 10 microns and about 50 microns, such as between about 20 microns and about 40 microns. In a number of embodiments, the adhesive layer 1121 may have a thickness, $T_{AL}$, of between about 15 and 60 microns. In a number of embodiments, the adhesive layer 1121 may have a thickness, $T_{AL}$, of between about 30 and 100 microns. It will be further appreciated that the thickness, $T_{AL}$, of the adhesive layer 1121 may be any value between any of the minimum and maximum values noted above. The thickness of the adhesive layer 1121 may be uniform, i.e., a thickness at a first location of the adhesive layer 1121 can be equal to a thickness at a second location therealong. The thickness of the adhesive layer 1121 may be non-uniform, i.e., a thickness at a first location of the adhesive layer 1121 can be different from a thickness at a second location therealong.

Figure 2C:
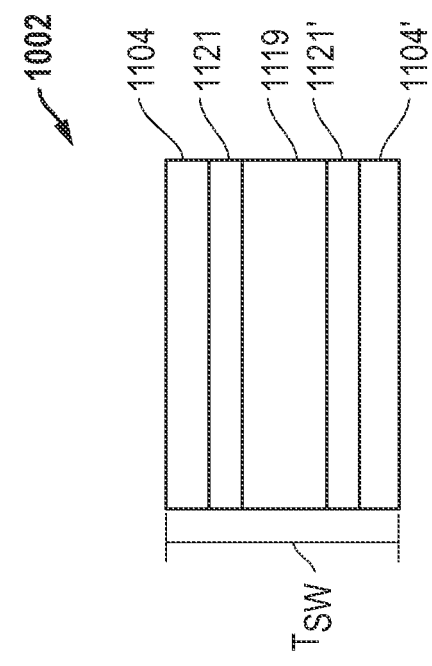
FIG. 2C is an illustration of the layer structure of a bearing according to a number of embodiments.
Figure 2B:
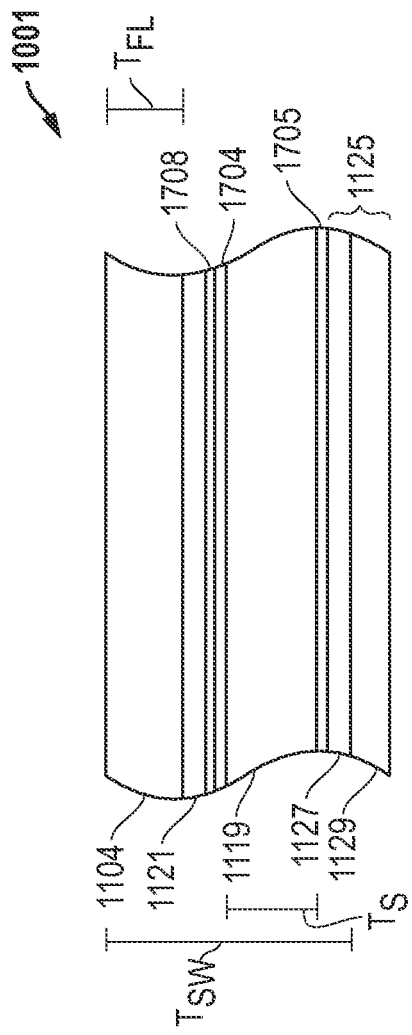
FIG. 2B is an illustration of the layer structure of a bearing according to a number of embodiments.

FIG. 2B includes an illustration of another embodiment. For purposes of illustration, FIG. 2B shows the layer-by-layer configuration of a composite material 1001 after second step 14. According to this particular embodiment, the composite material 1001 may be similar to the composite material 1000 of FIG. 2A, except this composite material 1001 may also include corrosion protection layers 1704, 1705, and 1708, and a corrosion resistant layer 1125 that can include an adhesion promoter layer 1127 and an epoxy layer 1129 that may couple to the substrate 1119 (i.e., the base material provided in the first step 12) and a low friction layer 1104 (i.e., the low friction coating applied in second step 14).

The substrate 1119 may be coated with corrosion protection layers 1704 and 1705 to prevent corrosion of the substrate 1119 prior to processing. Additionally, a corrosion protection layer 1708 can be applied over layer 1704. Each of layers 1704, 1705, and 1708 can have a thickness of about 1 to 50 microns, such as about 7 to 15 microns. Layers 1704 and 1705 can include aluminum, zinc, magnesium, nickel, tin or any alloy thereof, phosphate of zinc, iron, manganese, or any combination thereof, or a nano-ceramic layer. Further, layers 1704 and 1705 can include functional silanes, nano-scaled silane based primers, hydrolyzed silanes, organosilane adhesion promoters, solvent/water based silane primers, chlorinated polyolefins, passivated surfaces, commercially available zinc (mechanical/galvanic) or zinc-nickel coatings, or any combination thereof. Layer 1708 can include functional silanes, nano-scaled silane based primers, hydrolyzed silanes, organosilane adhesion promoters, solvent/water based silane primers or any kind of chromium based, zirconium based or titan based conversion coating or even phosphatization. Corrosion protection layers 1704, 1706, and 1708 can be removed or retained during processing.

As stated above, the composite material 1001 may further include a corrosion resistant layer 1125. The corrosion resistant layer 1125 can have a thickness of about 1 to 50 microns, such as about 5 to 20 microns, and such as about 7 to 15 microns. The corrosion resistant layer 1125 can include an adhesion promoter layer 1127 and an epoxy layer 1129. The adhesion promoter layer 1127 can include a phosphate of zinc, iron, manganese, tin, or any combination thereof, or a nano-ceramic layer. The adhesion promoter layer 1127 can include functional silanes, nano-scaled silane based layers, hydrolyzed silanes, organosilane adhesion promoters, solvent/water based silane primers, chlorinated polyolefins, passivated surfaces, commercially available zinc (mechanical/galvanic) or Zinc-Nickel coatings, or any combination thereof. The epoxy layer 1129 can be a thermal cured epoxy, a UV cured epoxy, an IR cured epoxy, an electron beam cured epoxy, a radiation cured epoxy, or an air-cured epoxy. Further, the epoxy layer 1129 can include polyglycidylether, diglycidylether, bisphenol A, bisphenol F, oxirane, oxacyclopropane, ethylenoxide, 1,2-epoxypropane, 2-methyloxirane, 9,10-epoxy-9,10-dihydroanthracene, or any combination thereof. The epoxy layer 1129 can further include a hardening agent. The hardening agent can include amines, acid anhydrides, phenol novolac hardeners such as phenol novolac poly[N-(4-hydroxyphenyl)maleimide] (PHPMI), resole phenol formaldehydes, fatty amine compounds, polycarbonic anhydrides, polyacrylate, isocyanates, encapsulated polyisocyanates, boron trifluoride amine complexes, chromic-based hardeners, polyamides, or any combination thereof. Generally, acid anhydrides can conform to the formula R—C═O—O—C═O—R' where R can be $C_XH_YX_ZA_U$ as described above. Amines can include aliphatic amines such as monoethylamine, diethylenetriamine, triethylenetetraamine, and the like, alicyclic amines, aromatic amines such as cyclic aliphatic amines, cyclo aliphatic amines, amidoamines, polyamides, dicyandiamides, imidazole derivatives, and the like, or any combination thereof.

Generally, amines can be primary amines, secondary amines, or tertiary amines conforming to the formula $R_1R_2R_3N$ where R can be $C_XH_YX_ZA_U$ as described above. In an embodiment, the epoxy layer 1129 can include fillers to improve the conductivity, such as carbon fillers, carbon fibers, carbon particles, graphite, metallic fillers such as bronze, aluminum, and other metals and their alloys, metal coated carbon fillers, metal coated polymer fillers, or any combination thereof. The conductive fillers can allow current to pass through the epoxy coating and can increase the conductivity of the coated bearing as compared to a coated bearing without conductive fillers.

FIG. 2C includes an illustration of another embodiment. For purposes of illustration, FIG. 2C shows the layer-by-layer configuration of a composite material 1002 after second step 14. According to this particular embodiment, the composite material 1002 may be similar to the composite material 1000 of FIG. 2A and the composite material 1001 of FIG. 2B, except this composite material 1002 may include a substrate 1119 (i.e., the base material provided in the first step 12) and a plurality of low friction layers 1104, 1104' (i.e., the low friction coating applied in second step 14) coupled to the substrate by a plurality of adhesive layers 1121, 1121'. It may be understood that any of the intervening layers (i.e. corrosion protection layers 1704, 1705, and 1708, or corrosion resistant layer 1125 that can include an adhesion promoter layer 1127 and/or an epoxy layer 1129) of the composite material 1001 shown in FIG. 2B may be included between any of the layers shown in FIG. 2C in any orientation or stacking.

In an embodiment, the composite material 1000, 1001, 1002 can have a thickness, $T_{SW}$, in a range of 0.1 mm and 5 mm, such as in a range of 0.2 mm and 3 mm, or even in a range of 0.3 mm and 1.5 mm. It will be further appreciated that the thickness, $T_{SW}$ of the composite material 1000, 1001, 1002 may be any value between any of the minimum and maximum values noted above. The thickness, $T_{SW}$ of the composite material 1000, 1001, 1002 may be uniform, i.e., a thickness at a first location of the composite material 1000, 1001, 1002 can be equal to a thickness at a second location therealong. The thickness, $T_{SW}$ of the composite material 1000, 1001, 1002 may be non-uniform, i.e., a thickness at a first location of the composite material 1000, 1001, 1002 can be different than a thickness at a second location therealong.

In an embodiment, under step 14 of FIG. 1, any of the layers on the composite material 1000, 1001, 1002 as described above, can each be disposed in a roll and peeled therefrom to join together. Joining may be done under pressure, and optionally at elevated temperatures (e.g., pressed), and with an adhesive. Any of the layers of the composite material 1000, 1001, 1002 as described above, may be laminated together such that they at least partially overlap one another. The low friction layer(s) 1104, 1104' may be laminated onto a surface of the substrate 1119 or another intervening layer. The sheet may be formed into a substrate 1119 having radial inner and outer surfaces. Low friction layer(s) 1104, 1104' may encapsulate the substrate 1119 such that at least one of the radial inner and outer surfaces of the substrate 1119 may be located within the low friction layer(s) 1104, 1104'.

Referring now to the third step 16 of the manufacturing process 10 as shown in FIG. 1, according to certain embodiments, forming the composite material 1000, 1001, 1002 into a bearing may include gluing the low friction layer(s) 1104, 1104' or any intervening layers can to the substrate 1119 using a melt adhesive 1121, 1121' to form a laminate. The laminate can be cut into blanks that can be formed into the bearing. The cutting of the laminate into a blank may include use of a stamp, press, punch, saw, deep drawing, or may be machined in a different way. Cutting the laminate into a blank can create cut edges including an exposed region of the substrate 1119. The blanks can be formed into the bearing, such as by rolling and flanging the laminate to form a bearing of a desired shape. The forming of the bearing from the blank may include use of a stamp, press, punch, saw, deep drawing, or may be machined in a different way. In some embodiments, the edges of the blank may be bent into a flange in a secondary operation. The bearing may be formed as a single unit or unitary piece of material.

For purposes of illustration, FIG. 3A illustrates a bearing (generally designated 31) shape that may be produced by rolling of an appropriately dimensioned piece of composite material 1000, 1001, 1002 which may be initially present as a blank as described above. The bearing 31 may extend in the axial direction relative to a central axis 3000. That is, central axis 3000 may extend longitudinally along the length of the bearing 31. The sidewall 308 having an inner radial end or edge 307 and an outer radial end or edge 309. The sidewall 308 may have an inner surface 312 and an outer surface 314. In a number of embodiments, the sidewall 308 may include a substrate 1119 and at least one low friction layer 1104 of the composite material 1000, 1001, 1002 as shown in FIGS. 2A-2C. As stated above, low friction material 1104 may cover essentially the entirety of at least one of the inner surface 312 or the outer surface 314 of the bearing 31.

The bearing 31 may be rolled to include a sidewall 308 that may include a generally cylindrical body 310 that may form an annular shape having a first axial end or edge 303 and a second axial end or edge 305. As used herein, "generally cylindrical" refers to shape which, when positioned in a best fit cylinder having a body of revolution about an axis, deviates from the best fit cylinder by no greater than 15% at any location, no greater than 10% at any location, no greater than 5% at any location, no greater than 4% at any location, no greater than 3% at any location, no greater than 2% at any location, or no greater than 1% at any location. In an embodiment, "generally cylindrical" may refer to the generally cylindrical body 310 as assembled between inner and outer components—i.e., in the installed state. In another embodiment, "generally cylindrical" may refer to the generally cylindrical body 310 prior to assembly between inner and outer components—i.e., in the uninstalled state. In a particular embodiment, the generally cylindrical sidewall may be a cylindrical sidewall having a shape corresponding to a revolution about an axis with two longitudinal planar end sections. In a particular embodiment, the cylindrical sidewall may have nominal surface roughness, such as for example, caused during typical machining and fabrication processes.

Still referring to FIG. 3A, as stated above, the blank may be rolled to form a bearing sidewall 308 that may include a generally cylindrical body 310 that may form an annular shape. The rolling may form a first circumferential end 340 and a second circumferential end 342 in the bearing 31, sidewall 308, and/or generally cylindrical body 310 about the central axis 3000. The first circumferential end 340 may have a first end face. The second circumferential end 342 may have a second end face. The end faces of the first circumferential end 340 and the second circumferential end 342 may be adapted to contact each other to form an interface 344 that may form an axial split 346 that runs in the axial direction down the bearing sidewall 308. Axial splits 346 running in any nonlinear fashion and/or obliquely (e.g.

diagonally) to the axis 3000 of symmetry of the bearing 31 are also possible. In some embodiments, the axial split 346 may be left uncoupled to ease assembly of the bearing 31. In a number of particular embodiments, the axial split 346 may be welded or otherwise coupled by other means to form a closed bearing 31. The bearing 31 may include a bore 335. The bore 335 may extend down the axial length of the bearing 31 and be adapted to couple to another component of an assembly.

In a number of embodiments, as shown in FIG. 3A, the bearing 31 can have an overall length, L, from first axial end 303 to the second axial end 305, and L can be ≥0.5 mm, ≥1 mm, ≥2 mm, ≥5 mm, ≥10 mm, or ≥50 mm. The length, L, can be ≤500 mm, such as ≤250 mm, ≤150 mm, ≤100 mm, or ≤50 mm. In a number of embodiments, the bearing 31 can have an overall length, L, of between about 3 to 50 mm. It will be appreciated that the bearing 31 can have an overall length, L, which may be within a range between any of the minimum and maximum values noted above. It will be further appreciated that the bearing 31 can have an overall length, L, which may be any value between any of the minimum and maximum values noted above.

For purposes of illustration, FIG. 3B illustrates a bearing (generally designated 32) shape that may be produced by rolling and flanging of an appropriately dimensioned piece of composite material 1000, 1001, 1002 which may be initially present as a blank as described above. FIG. 3B may include all of the structure and design of FIG. 3A and, for sake of brevity, the corresponding reference numerals were kept the same and refer to the same structures as those of FIG. 3A. FIG. 3B may differ from FIG. 3A in that the bearing 32 of FIG. 3B may have an annular shape that is substantially L shaped in axial-cross section. In other words, the bearing 32 may have an L shaped bearing cross-section extending in the radial and axial direction. Other axial cross-sectional shapes of the bearing are possible. For example, the bearing 32 may have a C shaped bearing cross-section. In a number of embodiments, the L-shape bearing 32 may be achieved by a deep-drawing process involving stamping a formed bearing 32.

In a number of embodiments, the bearing sidewall 308 may further include at least one flange 322. The flange 322 can be generally annular about the central axis 3000. The flange 322 may project radially outwardly from at least one of the first axial end 303 or the second axial end 305. The flange 322 may extend radially outward from the inner radial end 307 to the outer radial end 309. Alternatively, the flange 322 may extend radially inward from outer radial end 309 to the radially inner end 307 (not shown). In a number of embodiments, the flange 322 may form a generally planar outermost axial surface at the outer radial end 309 of the bearing 32. In a number of embodiments, the flange 322 may be formed with a low friction layer 1104 or low friction material formed at the outermost axial surface at the outer radial end 309 of the bearing 32. In a number of embodiments, the outer radial end 309 may form the outer radius OR of the bearing 32 as measured radially from the central axis 3000. In a number of embodiments, the inner radial end 307 may form the inner radius IR of the bearing 32 as measured radially from the central axis 3000. In other words, a radial width of the flange 322 $W_{RF}$ may be the distance from the difference in distance of the outer radius OR and the inner radius IR. In a number of embodiments, the flange 322 may include an axial opening 326. The axial opening 326 may provide a hole or space in the flange 322. In a number of embodiments, the flange 322 may include a plurality of axial openings 326 providing a segmented flange (not shown). In certain embodiments, the axial opening 326 can be contiguous with the axial split 346 in the generally cylindrical body 310.

In a number of embodiments, the at least one flange 322 may be contiguous with and extend from an axial end 303, 305 of the generally cylindrical body 310 of the bearing 32. In an embodiment, the flange 322 may be positioned to project orthogonal to the generally cylindrical body 310. In other embodiments, the flange 322 may be positioned to project non-orthogonal to the generally cylindrical body 310. In some embodiments, as shown best in FIG. 3B, the flange 322 may form an angle Θ with the generally cylindrical body 310 (and the central axial 3000). Angle Θ may be in a range from at least 0° to 180°. The angle Θ may be 30° or greater, such as 45° or greater, 55° or greater, or 85° or greater. The angle Θ may be 150° or less, such as 135° or less, 120° or less, 90° or less, or 60° or less. In a number of specific embodiments, the angle Θ may be in a range of 60° to 120°.

In a number of embodiments, as shown in FIG. 3B, the bearing 32 may have an overall inner radius, IR, from the central axis 3000 to the inner radial end 306, and IR can be ≥1 mm, such as ≥5 mm, ≥10 mm, ≥15 mm, ≥20 mm, or ≥50 mm. The inner radius IR can be ≤50 mm, such as ≤20 mm, ≤15 mm, ≤10 mm, ≤5 mm, or ≤1 mm. The inner radius IR may vary along the circumference of the bearing 32. In a number of embodiments, the bearing 32 can have an overall inner radius, IR, of between about 2 to 20 mm. It will be appreciated that the bearing 32 can have an overall inner radius, IR, which may be within a range between any of the minimum and maximum values noted above. It will be further appreciated that the bearing 32 can have an overall inner radius, IR, which may be any value between any of the minimum and maximum values noted above.

In a number of embodiments, as shown in FIG. 3B, the bearing 32 may have an overall outer radius, OR, from the central axis 3000 to the outer radial end 307, and OR can be ≥1.5 mm, such as ≥5 mm, ≥10 mm, ≥20 mm, ≥40 mm, or ≥70 mm. The outer radius OR can be ≤80 mm, such as ≤50 mm, ≤30 mm, ≤20 mm, ≤10 mm, or ≤3 mm. The overall outer radius, OR, may vary along the circumference of the bearing 32. In a number of embodiments, the bearing 32 can have an overall outer radius, OR, of between about 3 to 30 mm. It will be appreciated that the bearing 32 can have an overall outer radius, OR, that may be within a range between any of the minimum and maximum values noted above. It will be further appreciated that the bearing 32 can have an overall outer radius, OR, that may be any value between any of the minimum and maximum values noted above. Further, as stated above, the radial width of the flange 322, $W_{RF}$, may be the distance from the difference in distance of the outer radius OR and the inner radius IR.

In a number of embodiments, as shown in FIG. 3B, the flange 322 of the bearing 32 can have a thickness, $T_{RF}$, of between about 0.3 mm to about 10 mm, such as between about 0.5 mm and about 8 mm, such as between about 1 mm and about 5 mm, such as between about 1.5 mm and about 4 mm. In a number of embodiments, the flange 322 can have a thickness, $T_{RF}$, of between about 0.3 to 2 mm. It will be appreciated that the flange 322 can have a thickness, $T_{RF}$, which may be within a range between any of the minimum and maximum values noted above. It will be further appreciated that the flange 322 can have a thickness, $T_{RF}$, which may be any value between any of the minimum and maximum values noted above. It may also be appreciated that the thickness, $T_{RF}$, of the flange 322 may vary around the circumference of the bearing 32.

For purposes of illustration, FIG. 3C illustrates a bearing (generally designated 33) shape that may be produced by rolling and flanging of an appropriately dimensioned piece of composite material 1000, 1001, 1002 which may be initially present as a blank as described above. FIG. 3C may include all of the structure and design of FIGS. 3A and 3B and, for sake of brevity, the corresponding reference numerals were kept the same and refer to the same structures as those of FIGS. 3A and 3B. FIG. 3C may differ from FIG. 3B in that the bearing 33 of FIG. 3C may include a bearing sidewall 308 with a tapered cylindrical portion that can be formed by rolling a tapered portion and flanging an end.

For purposes of illustration, FIG. 3D illustrates a bearing (generally designated 34) shape that may be produced by rolling and flanging of an appropriately dimensioned piece of composite material 1000, 1001, 1002 which may be initially present as a blank as described above. FIG. 3D may include all of the structure and design of FIGS. 3A-3C and, for sake of brevity, the corresponding reference numerals were kept the same and refer to the same structures as those of FIGS. 3A-3C. FIG. 3D may differ from FIG. 3B in that the bearing 34 of FIG. 3D illustrates a flanged bearing 34 mounted in a housing with a shaft pin mounted through the flanged bearing 34. Further, the flanged bearing 34 of FIG. 3D may have an axial opening 326 that is non-contiguous with the axial split 346 in the generally cylindrical body 310.

For purposes of illustration, FIG. 3E illustrates a bearing (generally designated 35) shape that may be produced by rolling and flanging of an appropriately dimensioned piece of composite material 1000, 1001, 1002 which may be initially present as a blank as described above. FIG. 3E may include all of the structure and design of FIGS. 3A-3D and, for sake of brevity, the corresponding reference numerals were kept the same and refer to the same structures as those of FIGS. 3A-3D. FIG. 3E may differ from FIG. 3B in that the bearing 35 of FIG. 3E illustrates a two-sided flanged bearing 35 mounted in a housing with a shaft pin mounted through the two-sided flanged bearing 35. As shown in FIG. 3E, a radial flange 322, 322' may be positioned at both the first axial end 303 and the second axial end 305 of the bearing 35.

For purposes of illustration, FIGS. 3F-3G illustrate a close up perspective view and a close up side view respectively of a bearing (generally designated 36) shape that may be produced by rolling of an appropriately dimensioned piece of composite material 1000, 1001, 1002 which may be initially present as a blank as described above. FIGS. 3F-3G may include all of the structure and design of FIGS. 3A and 3B and, for sake of brevity, the corresponding reference numerals were kept the same and refer to the same structures as those of FIGS. 3A and 3B.

Referring to FIGS. 3F-3G, the first circumferential end 340 and the second circumferential end 342 of the bearing 36 may be adapted to contact each other to form an interface 344 that may form an axial split 346 that extends in the axial direction along the bearing sidewall 308. The first circumferential end 340 may form an apex region 350. The second circumferential end 342 may form a nadir region 352. In a number of embodiments, the first circumferential end 340 may have a first axial leg 340a and a second axial leg 340b. In a number of embodiments, the second circumferential end 342 may have a first axial leg 342a and a second axial leg 342b. In a number of embodiments, the first axial leg 340a of the first circumferential end 340 pairs with the a first axial leg 342a of the second circumferential end 342, and the second axial leg 340b of the first circumferential end 340 pairs with the second axial leg 342b of the second circumferential end 342 to contact to form a V-shaped interface.

In a number of embodiments, as shown best in FIG. 3G, the apex region 350 may form a general angle α. defined as those angle ≤180°, wherein α is at least 30°, such as at least 60°, such as at least 90°, such as at least 120°, or such as at least 150°. The apex region 350 may form a general angle α. defined as those angle ≤180°, wherein α is no greater than 180°, such as no greater than 120°, such no greater than 90°, such as no greater than 60°, or such as no greater than 45°.

In a number of embodiments, at least one of the apex region 350 or the nadir region 352 may have a void 354 to prevent contact between the apex region 350 of the first circumferential end 340 and the nadir region 352 of the second circumferential end 342. As shown in FIG. 3F, the void 354 may be in the nadir region 352. As shown in FIG. 3G, the void 354 may be in the apex region 350. In an embodiment, the void 354 may extend 100% of the overall thickness, $T_{SW}$, such that the void 354 may create a gap 356 in the sidewall 308 entirely and add additional space to the axial split 346 between the first circumferential end 340 and the second circumferential end 342. In some embodiments, the gap 356 may prevent the first circumferential end and the second circumferential end from contacting each other along the entirety of their respective radial thicknesses.

For purposes of illustration, FIG. 3H illustrates a close up perspective view of a bearing (generally designated 37) shape that may be produced by rolling and flanging of an appropriately dimensioned piece of composite material 1000, 1001, 1002 which may be initially present as a blank as described above. FIGS. 3F-3G may include all of the structure and design of FIGS. 3A-3B and, for sake of brevity, the corresponding reference numerals were kept the same and refer to the same structures as those of FIGS. 3A-3B. As shown in FIG. 3H, the split may be included in the flange 322 to form a different interface 344 shape. Many different interface 344 shapes are possible.

Figure 3I:
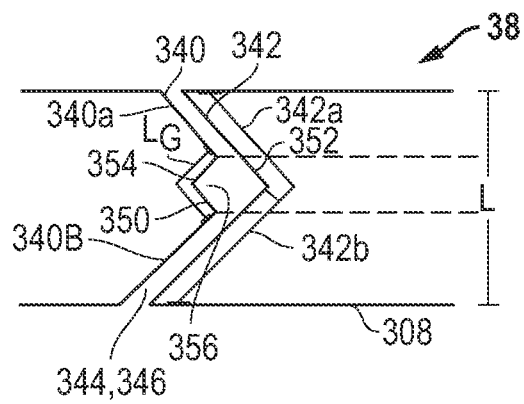
FIG. 3I is an illustration of a bearing according to a number of embodiments.

For purposes of illustration, FIG. 3I illustrates a close up view of a bearing (generally designated 38) in a cross-section of a plane parallel to the central axis 3000 that may be produced by rolling of an appropriately dimensioned piece of composite material 1000, 1001, 1002 which may be initially present as a blank as described above. FIG. 3I may include all of the structure and design of FIGS. 3A-3B and 3F-3G and, for sake of brevity, the corresponding reference numerals were kept the same and refer to the same structures as those of FIGS. 3A-3B and 3F-3G. As shown in FIG. 3I, the gap 356 may form a different interface 344 shape. Many different interface 344 shapes are possible. The gap 356 may have a cross-sectional shape in the circumferential direction of the bearing 38, including polygonal, oval, circular, semi-circular, or may be another type.

As shown in FIG. 3I, the gap 356 may have a cross-sectional shape in the circumferential direction of the bearing 38, including polygonal, oval, circular, semi-circular, or may be another type. In a number of embodiments, the gap 356 may have a gap length, $L_G$, which may be defined as the axial projection of the length that the gap 356 creates in the axial split 346. In a number of embodiments, $L_G<0.5$ L, such as $L_G<0.25$ L, such as $L_G<0.15$ L, such as $L_G<0.10$ L, or such as $L_G<0.05$ L.

Figure 3J:
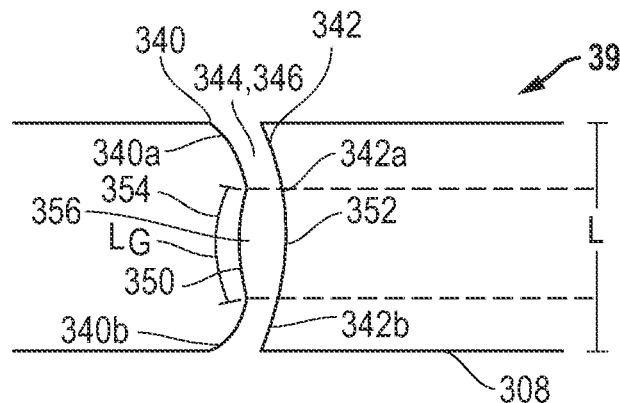
FIG. 3J is an illustration of a bearing according to a number of embodiments.

For purposes of illustration, FIG. 3J illustrates a close up view of a bearing (generally designated 39) in a cross-section of a plane parallel to the central axis 3000 that may be produced by rolling of an appropriately dimensioned piece of composite material 1000, 1001, 1002 which may be initially present as a blank as described above. FIG. 3J may include all of the structure and design of FIGS. 3A-3B and 3F-3I and, for sake of brevity, the corresponding reference numerals were kept the same and refer to the same structures as those of FIGS. 3A-3B and 3F-3I. As shown in FIG. 3J, the first axial leg 340a of the first circumferential end 340 pairs with the a first axial leg 342a of the second circumferential end 342, and the second axial leg 340b of the first circumferential end 340 pairs with the second axial leg 342b of the second circumferential end 342 to contact to form a C-shaped interface 344 and still another different interface 344 shape. Many different interface 344 shapes are possible.

Figure 3K:
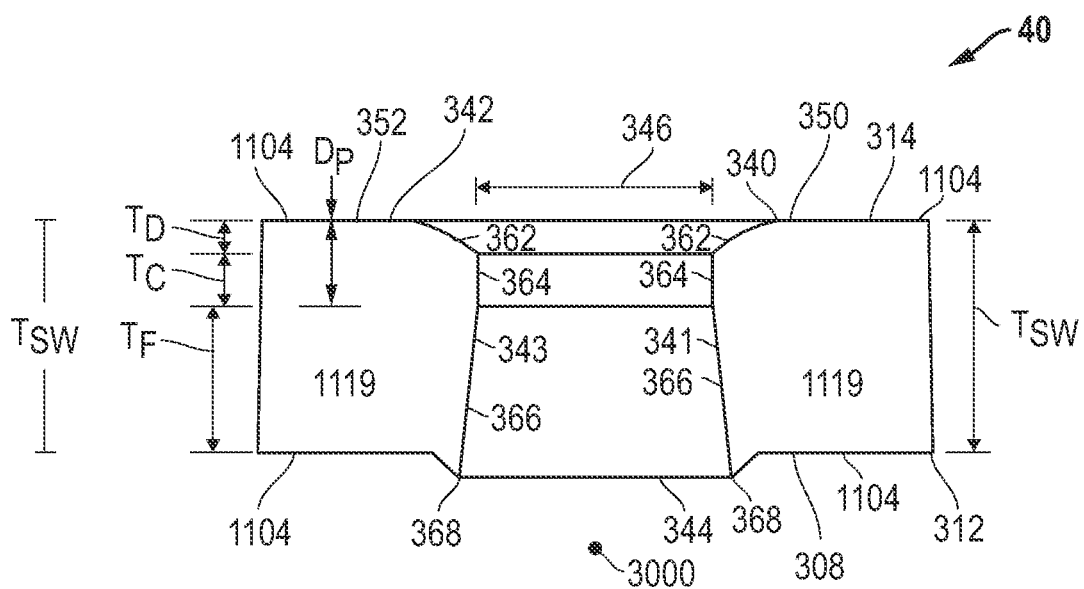
FIG. 3K is an illustration of a bearing according to a number of embodiments.

For purposes of illustration, FIG. 3K illustrates a close up view of a bearing (generally designated 40) in a cross-section of a plane parallel to the central axis 3000 that may be produced by rolling of an appropriately dimensioned piece of composite material 1000, 1001, 1002 which may be initially present as a blank as described above. FIG. 3K may include all of the structure and design of FIGS. 3A-3B and 3F-3J and, for sake of brevity, the corresponding reference numerals were kept the same and refer to the same structures as those of FIGS. 3A-3B and 3F-3J. As shown in FIG. 3K, the first circumferential end 340 may have an end face 341 and the second circumferential end may have an end face 343. The end faces 341, 343 of the first circumferential end 340 and the second circumferential end 342 may be adapted to contact each other to form an interface 344 that may form an axial split 346 that runs in the axial direction down the bearing sidewall 308. As stated above, the forming of the bearing 40 from the blank may include use of a stamp, press, punch, saw, deep drawing, or may be machined in a different way. As shown best in FIG. 3K, the end faces 341, 343 of at least one of the first circumferential end 340 or the second circumferential end 342 may include multiple regions as a result of the forming process. The end faces 341, 343 of the first circumferential end 340 or the second circumferential end 342 may have an end face 341, 343 that includes a deformation zone 362. The deformation zone 362 may have a thickness $T_D$. The end faces 341, 343 of the first circumferential end 340 or the second circumferential end 342 may have an end face 341, 343 that includes a cutting zone 364. The cutting zone 364 may have a thickness $T_C$. The end faces 341, 343 of the first circumferential end 340 or the second circumferential end 342 may have an end face 341, 343 that includes a fracture zone 366. The fracture zone 366 may have a thickness $T_F$.

In some embodiments, the thicknesses of the deformation zone 362, $T_D$, may be at least 5% of the overall thickness, $T_{SW}$, of the sidewall 308, such as at least 1% of the overall thickness, $T_{SW}$, of the sidewall 308, such as at least 5% of the overall thickness, $T_{SW}$, of the sidewall 308, such as at least 10% of the overall thickness, $T_{SW}$, of the sidewall 308, or such as at least 20% of the overall thickness, $T_{SW}$, of the sidewall 308.

In some embodiments, the thicknesses of the cutting zone 364, $T_C$, May be at Least 5% of the overall thickness, $T_{SW}$, of the sidewall 308, such as at least 10% of the overall thickness, $T_{SW}$, of the sidewall 308, such as at least 15% of the overall thickness, $T_{SW}$, of the sidewall 308, such as at least 20% of the overall thickness, $T_{SW}$, of the sidewall 308, such as at least 25% of the overall thickness, $T_{SW}$, of the sidewall 308, such as at least 30% of the overall thickness, $T_{SW}$, of the sidewall 308, or such as at least 40% of the overall thickness, $T_{SW}$, of the sidewall 308.

In some embodiments, the thicknesses of the fracture zone 366, $T_F$, may be at least 5% of the overall thickness, $T_{SW}$, of the sidewall 308, such as at least 10% of the overall thickness, $T_{SW}$, of the sidewall 308, such as at least 20% of the overall thickness, $T_{SW}$, of the sidewall 308, such as at least 30% of the overall thickness, $T_{SW}$, of the sidewall 308, such as at least 40% of the overall thickness, $T_{SW}$, of the sidewall 308, such as at least 50% of the overall thickness, $T_{SW}$, of the sidewall 308, or such as at least 60% of the overall thickness, $T_{SW}$, of the sidewall 308.

As stated above, the bearing 40 may be produced by rolling of an appropriately dimensioned piece of composite material 1000, 1001, 1002, which may be initially present as a blank as described above. The bearing 40 may have a sidewall 308 that forms an inner surface 312 and an outer surface 314 where the low friction layer 1104 or low friction material 1104 covers essentially the entirety of at least one of the inner surface 312 or the outer surface 314. Further, the end face 341 of the first circumferential end 340 may be free of low friction layer 1104 or low friction material 1104. Further, the end face 343 of the second circumferential end 342 may be free of low friction layer 1104 or low friction material 1104. Further still, the end faces 341, 343 of the first circumferential end 340 and the second circumferential end 342 may be free of low friction layer 1104 or low friction material 1104. Further, the low friction layer 1104 or low friction material 1104 may extend up to the end faces 341, 343 of the first and second circumferential ends 340, 342 such that there is no visible exposed substrate 1119 at the intersection between at least one of the outer surface 314 or the inner surface 312, and at least one of the first or second circumferential ends 340, 342. In a further embodiment, referring back to FIG. 3A, the bearing 31 may have a sidewall 308 with a first axial edge 303 and a second axial edge 305 where at least one of the first axial edge 303 or the second axial edge 305 is free of the low friction layer 1104 or low friction material 1104 through stamping or cutting to produce a similar result as shown above in FIG. 3K regarding the first circumferential end 340 or the second circumferential end 342.

Figure 3L:
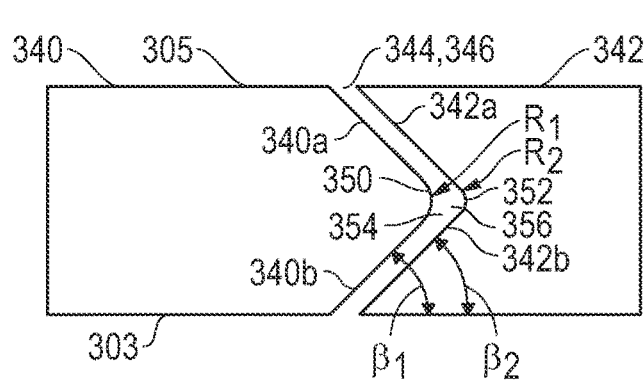
FIG. 3L is an illustration of a bearing according to a number of embodiments.
Figure 3M:
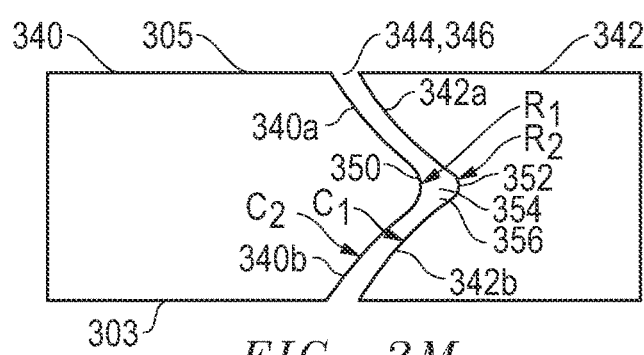
FIG. 3M is an illustration of a bearing according to a number of embodiments.
Figure 3N:
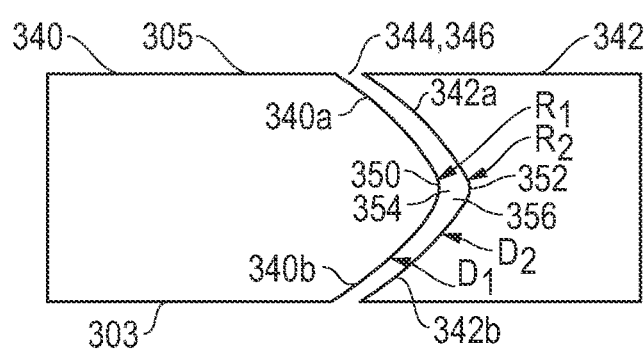
FIG. 3N is an illustration of a bearing according to a number of embodiments.
Figure 3O:
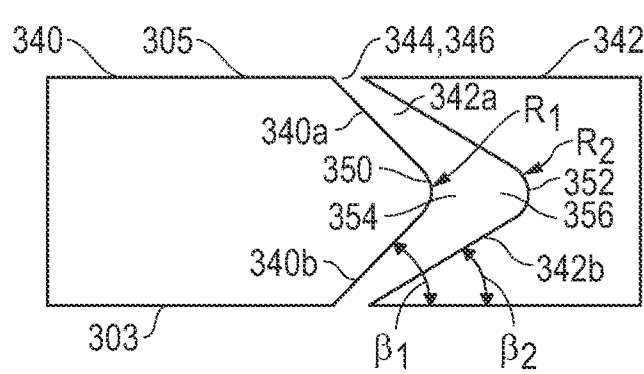
FIG. 3O is an illustration of a bearing according to a number of embodiments.

For purposes of illustration, FIGS. 3L-3O illustrate a close up side view of a bearing (generally designated 41-44 respectively) in a cross-section of a plane parallel to the central axis 3000 that may be produced by rolling of an appropriately dimensioned piece of composite material 1000, 1001, 1002 which may be initially present as a blank as described above. As shown in FIGS. 3L and 3O, the first circumferential end 340 may form an angle $\beta_1$ with a first axial end 303 of the generally cylindrical body 310 at the first axial leg 340a or the second axial leg 340b. Angle $\beta_1$ may be less than 90°. The angle $\beta_1$ may be 5° or greater, such as 15° or greater, 25° or greater, or 45° or greater. The angle $\beta_1$ may be 90° or less, such as 85° or less, 75° or less, 60° or less, or 45° or less. In a number of specific embodiments, the angle $\beta_1$ may be in a range of 15° to 60°. The second circumferential end 342 may form an angle $\beta_2$ with a first axial end 303 of the generally cylindrical body 310 at the first axial leg 342a or the second axial leg 342b. The angle $\beta_2$ may be 5° or greater, such as 15° or greater, 25° or greater, or 45° or greater. The angle $\beta_2$ may be less than 90°, such as 85° or less, 75° or less, 60° or less, or 45° or less. In a number of specific embodiments, the angle $\beta_2$ may be in a range of 15° to 60°. In a number of embodiments, $R_1$ may be equal to or substantially equal to $\beta_2$, as shown best in FIG. 3L. In a number of embodiments, $R_1$ may be substantially different from $\beta_2$, as shown best in FIG. 3O. $\beta_1$ must be greater than or equal to $\beta_2$. In a number of embodiments, the first circumferential end 340 may have a radius of curvature $R_1$ with a first axial end 303 of the generally cylindrical body 310 at a point along the first axial leg 340a, the second axial leg 340b, or the apex region 350. In a number of embodiments, the second circumferential end 342 may have a radius of curvature $R_2$ with a first axial end 303 or second axial end 305 of the generally cylindrical body 310 at a point along the first axial leg 340a, the second axial leg 340b, or the nadir region 352. In some embodiments, the apex region 350 of the first circumferential end 340 may have a radius of curvature, $R_1$, and the nadir region 352 of the second circumferential end 342 may have a radius of curvature, $R_2$, where $R_1 > R_2$, such as $0.75\ R_1 > R_2$, such as $0.5\ R_1 > R_2$, such as $0.25\ R_1 > R_2$, or such as $0.1\ R_1 > R_2$. In an embodiment, as shown best in FIG. 3L, the first axial leg 340a of the first circumferential end 340 and the first axial leg 320a of the second circumferential end 342 may have the same radius of curvature along their length, and the second axial leg 340b of the first circumferential end 340 and the second axial leg 342b of the second circumferential end 342 may have the same radius of curvature along their length. In an embodiment, as shown best in FIG. 3O, the first axial leg 340a of the first circumferential end 340 and the first axial leg 320a of the second circumferential end 342 may have a different radius of curvature along their length, and the second axial leg 340b of the first circumferential end 340 and the second axial leg 342b of the second circumferential end 342 may have a different radius of curvature along their length. The radius of curvature $R_1$ at a point along the first circumferential end 340 may be positive or negative. The radius of curvature $R_2$ at a point along the second circumferential end 342 may be positive or negative. For example, FIG. 3M shows a radius of curvature that is negative at a point along the radius of curvature $R_1$ of the first circumferential end 340 and a point along the radius of curvature $R_2$ the second circumferential end 342. $C_1$ and $C_2$ cannot terminate perpendicular to the first axial end 303 or second axial end 305. Alternatively, FIG. 3N shows a radius of curvature that is negative at a point along the radius of curvature $R_1$ of the first circumferential end 340 and a point along the radius of curvature $R_2$ the second circumferential end 342.

In a number of embodiments, as stated above, any of the exemplary bearings disclosed herein may be included in an assembly. The assembly may further include an inner component, such as a shaft. The assembly may further include an outer component, such as a housing. The assembly may include a bearing disposed between the inner member and the outer member. The bearing may include a bearing sidewall including a first circumferential end including an apex region, and a second circumferential end including a nadir region. The first circumferential end and the second circumferential end may be adapted to contact each other to form an interface, where at least one of the apex region or the nadir region includes a void to prevent contact between the apex region of the first circumferential end and the nadir region of the second circumferential end. The bearing sidewall may include a substrate and a low friction material, where at least one of the end faces of the first circumferential end or the second circumferential end may be free of low friction material.

Figure 4:
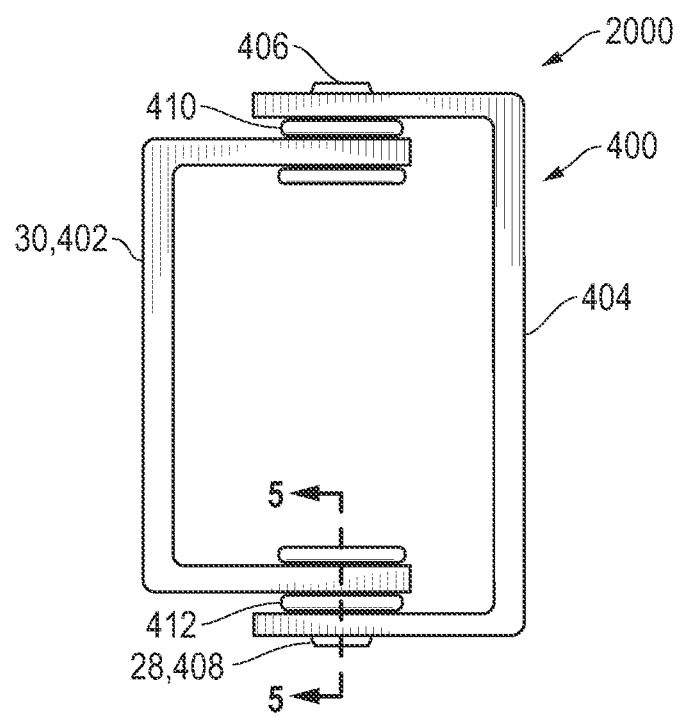
FIG. 4 is an illustration of a bearing within an assembly according to a number of embodiments.
Figure 5:
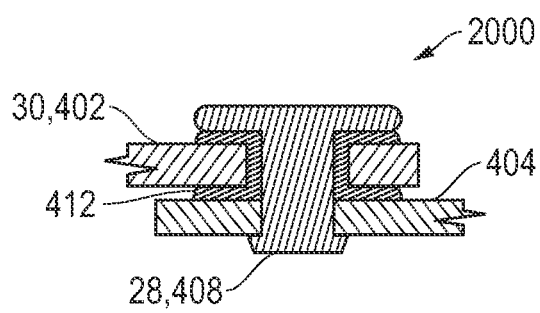
FIG. 5 is an illustration of a bearing within an assembly according to a number of embodiments.

FIGS. 4 and 5 illustrate an assembly 2000 in the form of an exemplary hinge 400, such as an automotive door hinge, hood hinge, engine compartment hinge, and the like. FIG. 5 is a close up cross-sectional view of the assembly 200 of FIG. 4. Hinge 400 can include an inner component 28 (such as an inner hinge region 402) and an outer hinge region 404. Hinge regions 402 and 404 can be joined by outer components such as rivets 406 and 408) and bearings 410 and 412. Bearings 410 and 412 can be bearings as previously described and labeled 31-40 herein. FIG. 5 illustrates a cross section of hinge 400, showing rivet 408 and bearing 412 in more detail.

FIG. 6 illustrates an assembly 2001 in the form of another exemplary hinge 600. Hinge 600 can include a first hinge region 602 and a second hinge region 604 joined by a pin 606 and a bearing 608. Bearing 608 can be a bearing as previously described and labeled 31-40 herein.

In an exemplary embodiment, FIG. 7 depicts a non-limiting example of an assembly 2002 in the form of an embodiment of another hinge assembly 700 including the parts of a disassembled automobile door hinge including bearing 704. FIG. 7 is an example of a profile hinge. The bearing 704 may be inserted in hinge door part 706. Bearing 704 can be a bearing as previously described and labeled 31-40 herein. Rivet 708 bridges the hinge door part 706 with hinge generally cylindrical body part 710. Rivet 708 may be tightened with hinge generally cylindrical body part 710 through set screw 712 and held in place with the hinge door part 706 through washer 702.

FIG. 8 illustrates an assembly 2003 in the form of an exemplary headset assembly 800 for a two-wheeled vehicle, such as a bicycle or motorcycle. A steering tube 802 can be inserted through a head tube 804. Bearings 806 and 808 can be placed between the steering tube 802 and the head tube 804 to maintain alignment and prevent contact between the steering tube 802 and the head tube 804. Bearings 806 and 808 can be bearings as previously described and labeled 31-40 herein. Additionally, seals 810 and 812 can prevent contamination of the sliding surface of the bearing by dirt and other particulate matter.

Such assemblies noted above are all exemplary and are not meant to limit the use of the bearing in potential other assemblies. For example, the bearing may be used in an assembly for a powertrain assembly application (such as belt tensioners) or other assembly applications with limited space.

The method of forming the bearing may include providing a blank. The bearing may be formed from a blank including a strip of material including a laminate including a substrate and a low friction layer overlying the substrate. The strip of material may be shaped to have a first end and a second end where the shaping includes shaping the first end to form an apex region and shaping the second end to form a nadir region, where at least one of the apex region or the nadir region includes a void. The method may further include roll forming the strip to form an annular bearing, where the first end and the second end form a complementary first circumferential end and a second circumferential end respectively.

Applications for such embodiments include, for example, assemblies for hinges and other vehicle components. Further, use of the bearing or assembly may provide increased benefits in several applications such as, but not limited to, vehicle tail gates, door frames, seat assemblies, powertrain applications (such as belt tensioners), or other types of applications. According to embodiments herein, the split bearings can better maintain "cylindricity" under high press fit conditions by providing deformation such that the second circumferential end to be forced axially away from the first circumferential end, maintaining a more consistent bearing radius compared to existing bearings known in the art. Therefore, split bearings according to embodiments herein allow the bearing to maintain hoop stress necessary for press fit and maintain alignment between the axial edges of the bearing relative to each other. In other words, the embodiments provided herein can reduce or eliminate the bending and/or "high-spots" in the radial direction caused by thermal expansion and/or high load conditions, often exhibited by existing bearings known in the art under high press conditions. As a result, split bearings according to embodiments herein may narrow torque range, improve concentricity and reduce wear of the bearing surface, thereby increasing lifetime and improving effectiveness and performance of the assembly, the bearing, and its other components.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the embodiments as listed below.

Embodiment 1

A bearing comprising: a bearing sidewall comprising a first circumferential end comprising an apex region, and a second circumferential end comprising a nadir region, wherein the first circumferential end and the second circumferential end are adapted to contact each other to form an interface, wherein at least one of the apex region or the nadir region comprises a void to prevent contact between the apex region of the first circumferential end and the nadir region of the second circumferential end, wherein the bearing sidewall comprises a substrate and a low friction material, and wherein at least one of the first circumferential end or the second circumferential end comprises an end face that is free of low friction material.

Embodiment 2

An assembly comprising: an inner component; an outer component; and a bearing disposed between the inner component and the outer component, wherein the bearing comprises a bearing sidewall comprising a first circumferential end comprising an apex region, and a second circumferential end comprising a nadir region, wherein the first circumferential end and the second circumferential end are adapted to contact each other to form an interface, wherein at least one of the apex region or the nadir region comprises a void to prevent contact between the apex region of the first circumferential end and the nadir region of the second circumferential end wherein the bearing sidewall comprises a substrate and a low friction material, and wherein at least one of the first circumferential end or the second circumferential end comprises an end face that is free of low friction material.

Embodiment 3

A method comprising: shaping a strip of material comprising a substrate and a low friction material, the strip having a first end and a second end, wherein shaping includes shaping the first end to form an apex region and the second end to form a nadir region, wherein at least one of the apex region or the nadir region comprises a void; and roll forming the strip to form an annular bearing, wherein the first end and the second ends form a complementary first and a second circumferential end respectively.

Embodiment 4

The bearing, assembly, or method of any of the preceding embodiments, wherein the bearing sidewall comprises a first axial end and a second axial end, wherein at least one of the first axial end or the second axial end is free of low friction material.

Embodiment 5

The bearing, assembly, or method of any of the preceding embodiments, wherein the bearing sidewall comprises an outer surface and an inner surface, wherein the low friction material covers essentially the entirety of at least one of the outer surface or the inner surface.

Embodiment 6

The bearing, assembly, or method of embodiment 5, wherein low friction material extends up to the end face of at least one of the first and second circumferential ends.

Embodiment 7

The bearing, assembly, or method of any of the preceding embodiments, wherein the end face of at least one of the first circumferential end or the second circumferential end comprises comprising a deformation zone, a cutting zone, and a fracture zone.

Embodiment 8

The bearing, assembly, or method of any of the preceding embodiments, wherein the first circumferential end has a radial thickness and the second circumferential end has a radial thickness, and wherein the first circumferential end and the second circumferential end contact each other along the entirety of their respective radial thicknesses.

Embodiment 9

The bearing, assembly, or method of any of the preceding embodiments, wherein the void creates a gap between the first circumferential end and the second circumferential end.

Embodiment 10

The bearing, assembly, or method of embodiment 9, wherein the interface has an interface length, L, and the gap has a gap length, $L_G$, and wherein $L_G<0.25$ L, such as $L_G<0.20$ L, such as $L_G<0.15$ L, such as $L_G<0.10$ L, or such as $L_G<0.05$ L.

Embodiment 11

The bearing, assembly, or method of any of the preceding embodiments, wherein the apex region of the first circumferential end has a radius of curvature, $R_1$, and the nadir region of the second circumferential end has a radius of curvature, $R_2$, and wherein $R_1>R_2$.

Embodiment 12

The bearing, assembly, or method of any of the preceding embodiments, wherein the first circumferential end comprises a first axial leg and a second axial leg, wherein the second circumferential end comprises a first axial leg and a second axial leg such that the first circumferential end and the second circumferential end contact to form a V-shaped interface.

Embodiment 13

The bearing, assembly, or method of any of the preceding embodiments, wherein the first circumferential end comprises a first axial end and a second axial end, wherein the second circumferential end comprises a first axial end and a second axial end such that the first circumferential end and the second circumferential end contact to form a C-shaped interface.

Embodiment 14

The bearing, assembly, or method of embodiment 13, wherein the first axial end of the first circumferential end and the first axial end of the second circumferential end have the same radius of curvature along their length, and wherein the second axial end of the first circumferential end and the second axial end of the second circumferential end have the same radius of curvature along their length.

Embodiment 15

The bearing, assembly, or method of any of the preceding embodiments, wherein the apex region forms a general angle α, defined as those angle ≤180°, wherein α is at least 30°, such as at least 60°, such as at least 90°, such as at least 120°, or such as at least 150°.

Embodiment 16

The bearing, assembly, or method of any of the preceding embodiments, wherein the apex region forms a general angle α. defined as those angle ≤180°, wherein α is no greater than 180°, such as no greater than 120°, such no greater than 90°, such as no greater than 60°, or such as no greater than 45°.

Embodiment 17

The bearing, assembly, or method of any of the preceding embodiments, wherein the substrate comprises steel.

Embodiment 18

The bearing, assembly, or method of any of the preceding embodiments, wherein the low friction material comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, or any combination thereof.

Embodiment 19

The bearing, assembly, or method of any of the preceding embodiments, wherein the bearing sidewall comprises a generally cylindrical body and a radial flange.

Embodiment 20

The bearing, assembly, or method of any of the preceding embodiments, wherein the radial flange comprises an opening at the interface between the first circumferential end and the second circumferential end.

Note that not all of the features described above are required, and that a region of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, however, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A bearing comprising:
   a bearing sidewall comprising a first circumferential end comprising an apex region, and a second circumferential end comprising a nadir region, wherein the first circumferential end and the second circumferential end are adapted to contact each other to form an interface, wherein at least one of the apex region or the nadir region comprises a void to prevent contact between the apex region of the first circumferential end and the nadir region of the second circumferential end, wherein the bearing sidewall comprises a substrate and a low friction material, and wherein at least one of the first circumferential end or the second circumferential end comprises an end face that is free of the low friction material, wherein the end face of at least one of the first circumferential end or the second circumferential end comprises comprising a deformation zone, a cutting zone, and a fracture zone.

2. The bearing of claim 1, wherein the bearing sidewall comprises a first axial end and a second axial end, wherein at least one of the first axial end or the second axial end is free of the low friction material.

3. The bearing of claim 1, wherein the bearing sidewall comprises an outer surface and an inner surface, wherein the low friction material covers essentially the entirety of at least one of the outer surface or the inner surface.

4. The bearing of claim 3, wherein low friction material extends up to the end face of at least one of the first and second circumferential ends.

5. The bearing of claim 1, wherein the first circumferential end has a radial thickness and the second circumferential end has a radial thickness, and wherein the first circumferential end and the second circumferential end contact each other along the entirety of their respective radial thicknesses.

6. The bearing of claim 1, wherein the void creates a gap between the first circumferential end and the second circumferential end.

7. The bearing of claim 6, wherein the interface has an interface length, L, and the gap has a gap length, $L_G$, and wherein $L_G<0.25$ L.

8. The bearing of claim 1, wherein the apex region of the first circumferential end has a radius of curvature, $R_1$, and the nadir region of the second circumferential end has a radius of curvature, $R_2$, and wherein $R_1>R_2$.

9. The bearing of claim 1, wherein the first circumferential end comprises a first axial leg and a second axial leg, wherein the second circumferential end comprises a first axial leg and a second axial leg such that the first circumferential end and the second circumferential end contact to form a V-shaped interface.

10. The bearing of claim 1, wherein the first circumferential end comprises a first axial end and a second axial end, wherein the second circumferential end comprises a first axial end and a second axial end such that the first circumferential end and the second circumferential end contact to form a C-shaped interface.

11. The bearing of claim 10, wherein the first axial end of the first circumferential end and the first axial end of the second circumferential end have the same radius of curvature along their length, and wherein the second axial end of the first circumferential end and the second axial end of the second circumferential end have the same radius of curvature along their length.

12. The bearing of claim 1, wherein the apex region forms a general angle α. defined as those angle ≤180°, wherein α is at least 30°.

13. The bearing of claim 1, wherein the apex region forms a general angle α. defined as those angle ≤180°, wherein α is no greater than 180°.

14. The bearing of claim 1, wherein the substrate comprises steel.

15. The bearing of claim 1, wherein the low friction material comprises a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, or any combination thereof.

16. The bearing of claim 1, wherein the bearing sidewall comprises a generally cylindrical body and a radial flange.

17. The bearing of claim 16, wherein the radial flange comprises an opening at the interface between the first circumferential end and the second circumferential end.

18. An assembly comprising:
an inner component;
an outer component; and
a bearing disposed between the inner component and the outer component, wherein the bearing comprises a bearing sidewall comprising a first circumferential end comprising an apex region, and a second circumferential end comprising a nadir region, wherein the first circumferential end and the second circumferential end are adapted to contact each other to form an interface, wherein at least one of the apex region or the nadir region comprises a void to prevent contact between the apex region of the first circumferential end and the nadir region of the second circumferential end wherein the bearing sidewall comprises a substrate and a low friction material, and wherein at least one of the first circumferential end or the second circumferential end comprises an end face that is free of the low friction material, wherein the end face of at least one of the first circumferential end or the second circumferential end comprises comprising a deformation zone, a cutting zone, and a fracture zone.

19. A method comprising:
shaping a strip of material comprising a substrate and a low friction material, the strip having a first end and a second end, wherein shaping includes shaping the first end to form an apex region and the second end to form a nadir region, wherein at least one of the apex region or the nadir region comprises a void; and
roll forming the strip to form an annular bearing, wherein the first end and the second ends form a complementary first and a second circumferential end
respectively, wherein at least one of the first circumferential end or the second circumferential end comprises an end face, wherein the end face of at least one of the first circumferential end or the second circumferential end comprises comprising a deformation zone, a cutting zone, and a fracture zone.

* * * * *